United States Patent [19]

Staats et al.

[11] 3,720,564

[45] March 13, 1973

[54] METHOD AND APPARATUS FOR INDIVIDUALLY LAMINATING BOUND SHEETS

[75] Inventors: Henry N. Staats, Deerfield; Neal J. Morrissey, Chicago, both of Ill.

[73] Assignee: General Binding Corporation, Northbrook, Ill.

[22] Filed: Jan. 13, 1971

[21] Appl. No.: 106,157

[52] U.S. Cl. ................156/477 B, 11/1 R, 156/582, 156/583
[51] Int. Cl. .............................................B42c 11/02
[58] Field of Search ..156/300, 477 B, 555, 582, 583; 11/4, 1, 2; 29/110, 121 R

[56] References Cited

UNITED STATES PATENTS 3,421,966  1/1969  McLaughlin ........................156/555

*Primary Examiner*—Edward G. Whitby
*Attorney*—Hill, Sherman, Meroni, Gross & Simpson

[57] ABSTRACT

A compact, inexpensive laminating device for applying heat and pressure to a sandwich of sheet materials desired to be laminated, at least one of which has previously been bound to other materials. A highly efficient material transfer and heat application system is constructed of a minimum of moving parts and simple provision is made for permitting the pass-through of the previously bound materials without being affected by the laminating device. Novel laminating roll configuration and mounting combine to permit lamination of photographs and other similar identification data in previously assembled books such as, for example, passports, bank deposit books, and the like, in a tamper-proof manner.

4 Claims, 4 Drawing Figures

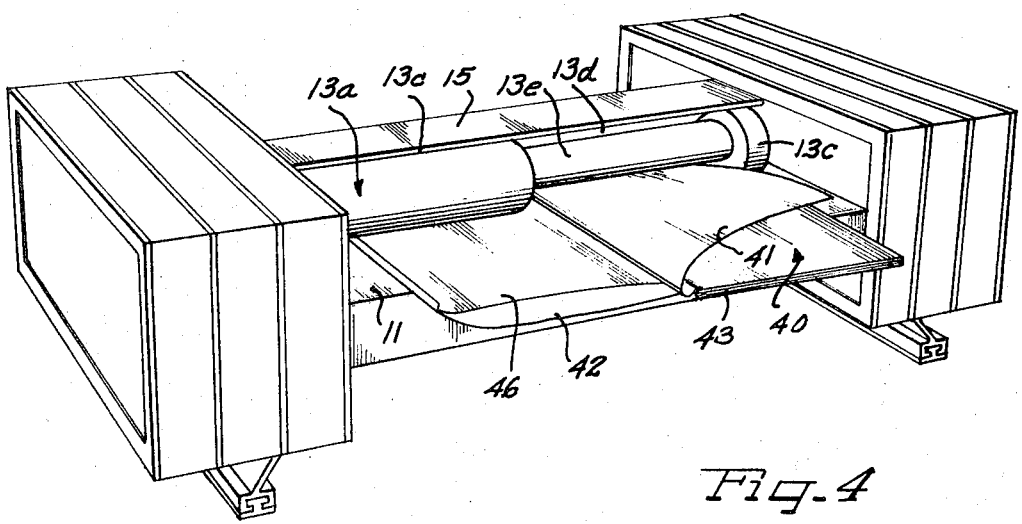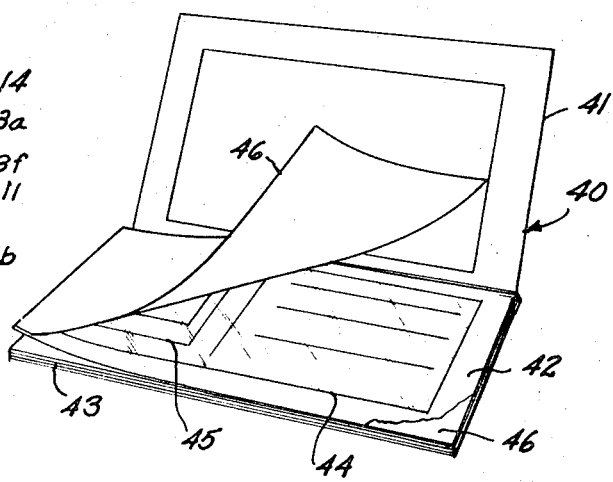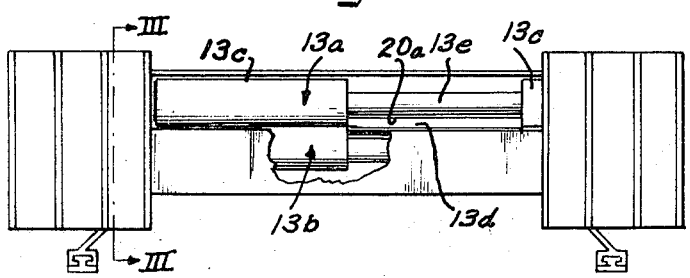

METHOD AND APPARATUS FOR INDIVIDUALLY LAMINATING BOUND SHEETS

BACKGROUND OF THE INVENTION

The art of laminating one or both sides of a paper core with a thermoplastic sheet material in which the thermoplastic sheet material extends peripherally around the edges of the paper core, has become a relatively sophisticated one. A very successful laminator apparatus for such lamination is shown and described in the copending application for U.S. Pat. Ser. No. 29,559 filed Apr. 17, 1970 in the name of Henry N. Staats et al. The laminator of the above-mentioned application provides a particularly efficient apparatus and method of laminating small-sized identification cards such as, for example, wallet-sized identification cards and shirt-pocket identification card devices. In that prior application, preferred laminating materials comprise, for example, a lamination of 1 mil polyester (for example, Mylar) laminated with 5 mils of polyethylene. In the arrangement there described, two layers of the laminate plastic material were placed face-to-face with the polyethylene surfaces adjacent one another, and an identification card, photograph or like sheet material was placed between the two polyethylene faces, with the polyethylene material extending beyond the outermost periphery of the card so that upon being passed through the laminator device in the presence of heat and pressure, the laminate became heat-sealed to the card and also, around the periphery thereof to itself, providing a tamper-proof ID card.

The system of the present invention permits the lamination of a photograph or other data directly to the surface of a sheet in a previously bound book, or the like, in a simple manner not heretofore accomplished in as simple and as practicable a manner. Although the lamination of a single page of a book has heretofore been described in U.S. Pat. No. 3,421,966 to J.A. McLaughlin, the system therein described provided for continuous lamination from roll film plastic in a cantilever mounted construction employing heated rolls. The method and apparatus shown in the prior McLaughlin patent was extremely expensive compared to the system of the present invention and due to cantilevered construction characteristics was of particularly massive construction. In contrast, the system of the present invention is extremely inexpensive, requires no cantilever configuration, expensive heated rolls, or the like.

SUMMARY OF THE INVENTION

In accordance with the present invention, a bank book, government passport, or related pamphlet, having a typical identification page therein, is laminated with a sheet of plastic material having one relatively inert layer bonded to a layer of heat-sealable material. As an example, a 4 mil (0.004 inch) polyester (for example, Mylar) film sheet coated with 6 mil (0.006 inch) heat-sealable resin material such as polyethylene or high molecular weight ethylene-ethyl acrylate copolymer is placed with the heat-sealable surface thereof in juxtaposition with the identification page of the pamphlet. A photograph or the like may at this time be inserted between a portion of the sheet film and the identification page. In a typical operation, the heat-sealable plastic film is of a dimension larger than the photograph but smaller than the dimensions of the identification page so that the heat-sealable material surrounds the photograph but will not, upon being heated, stick to the rollers or other parts of the laminating apparatus. A metal envelope is then preferably placed about the identification page and film and the identification page with the surrounding envelope is passed through the laminating apparatus while still attached to the remaining pages. In accordance with the present invention, the rolls of the laminating apparatus, as well as the heater elements employed separately therefrom, are interrupted or relieved along a portion of the length to permit passage of the bank book or passport without interference and without being pressurized. The metal envelope is removed leaving the film laminate securely heat-sealed to the identification page and, where a photograph or the like is employed, similarly heat-sealed to the photograph and to the page. Typically, such a passport, bank book, or the like is provided with only one side of an identification page having identification indicia. Where both sides of the page bear such data and it is important to minimize fraud by the lamination of both sides, a second layer of plastic laminate film may be positioned against the other side of the page prior to enclosing within the metal envelope. When such occurs, a sheet of plastic is laminated to both sides of the identification page by the present apparatus.

In accordance with the structure of the present apparatus, laminating rolls are provided resiliently biased against each other to provide a pressurized nip for each pair of rolls. The rolls are not heated, and, accordingly, no electrical conduits or electrical current-carrying materials need be employed in the rolls. In accordance with the present invention, the rolls comprise a rubber material surrounding a core, which core is provided with floating bearings at opposite ends of the roll. An interrupted portion of the rubber material is provided along the length of at least one of the rolls of each pair of rolls so that the materials bound to the identification page to be laminated may readily pass between the rolls, through the nip, without being pressurized. Heater elements positioned between the input drive rolls and the output laminating rolls provide an oven radiating heat directly against the metal-clad laminating sandwich. The heater elements are preferably also interrupted in radiating surface to permit passage of the materials bound to the identification page to pass without binding. As a result of this arrangement, the bearing loads are carried at the output ends of the rolls and uniform roll pressure is provided throughout the laminating area of the rolls in an extremely inexpensive manner.

DESCRIPTION OF THE DRAWINGS

FIG. 1 is an isometric view of a laminator constructed in accordance with the present invention illustrating the passage of a pamphlet therethrough;

FIG. 2 is an end elevational view of the laminator illustrated in FIG. 1;

FIG. 3 is a partial side elevational view illustrating the roll and heater construction of the laminating apparatus taken along line III—III of FIG. 2; and FIG. 4 is an isometric illustration of a pamphlet having the identification page thereof prepared for lamination.

DETAILED DESCRIPTION

As may be seen from a consideration of the drawing, the laminator of the present invention has a generally rectangular appearance. It is provided with a feed table member 11 and an output table 12 between which are positioned a first pair of feed rolls 13a, 13b, and a second pair of laminating rolls 14a, 14b. A heating oven is positioned between the rolls and is hidden from view in FIG. 1 by a heat-insulating cover 15.

The oven is formed by two superposed heater bars 20,21 forming an open channel between the nips 13f and 14f of the rolls. The heaters 20,21 preferably comprise extruded metal elements having longitudinal bores 22,23 carrying resistive heating elements 24,25. The heaters operate in the manner described in the above-mentioned application Ser. No. 29,559 and are as there described maintained in spaced relation by insulating plates 26,27 cooperating with slots 28,29 in the frame 14 and by springs 30. The roll 13 has the surface 13 thereof interrupted as at 13d showing a core 13e which rigidly supports both surface portions 13c. The interrupted portion 13d provides a passageway through which the pages 41,43 of a book or the like 40 may readily pass without being squeezed. Interruption of the roll surface is preferably sufficiently deep that the forwardly facing edge of the heater bars is exposed and may intercept the unsqueezed portions of the book or pamphlet. Accordingly, it is preferred that the heater bars be similarly relieved as shown in dotted lines at 20a and 20b in FIG. 3 as at 20a in FIG. 2. If the laminating device is intended for use with relatively thin pamphlets, it will be observed that only the top or bottom roll need be provided with the interrupted portion. However, typically the maximum free passage area is desired and, accordingly, in the typical installation both the top and bottom rolls of each pair will be provided with an interrupted portion and, similarly, both top and bottom heater bars will be relieved throughout substantially the same interrupted area.

The product being laminated in the present instance comprises a pamphlet or book such as shown at 40 in FIG. 4. Typically, the book has a cover 41 and bound therewith an identification page 42, and a plurality of additional pages 43. Examples of the type of books here under primary consideration are governmental passport books and bank savings deposit books. Such books typically require bearer identification and, accordingly, the identification page is a very important part of the book itself. It is desired in such cases that the identification page be substantially tamper-proof and that it provide a maximum of information, and further, that the information be substantially permanent in ordinary use as well as tamper-proof. Accordingly, the identification page is preferably laminated with a tamper-proof laminate such as polyester sheet, for example, Mylar, laminated with a heat-sealable film material, as above described. Such a sheet, shown at 44, is placed with the heat-sealable surface thereof against the page 42 and over a photograph 45 where such photograph is desired. The page 42, with the film 44 and photograph 45, are then preferably enveloped or sandwiched between the two flaps of a metal clip or envelope 46. With the page 42 thus enclosed, the pamphlet is bent backwardly until the two sides of the clip with the sandwiched page 42 and related members 44 and 45 are the sole projecting materials. At this point, the metal foil and its sandwiched parts are introduced into the laminator between the rolls 13a, 13b as illustrated in FIG. 1.

The rolls 13a, 13b and 14a, 14b rotate in the direction of the arrows shown in FIG. 3, all as described in the above-identified earlier application for U.S. Pat. Ser. No. 29,559, and the identification page is drawn through the laminator permanently bonding the film 44 to the page 42 and to the photograph 45 where such photograph is employed. As the pamphlet passes through the machine, the cover page 41 and the remaining pages 43, attached to page 42, pass through the apparatus without pressurization as a result of the passageway afforded through the interrupted rolls, as above described. Upon complete passage of the pamphlet through the machine, the metal clip is peeled away for reuse. It has been found that an aluminum clip, for example, does not permanently bond to the heat-sealable materials preferably employed and may, accordingly, be readily removed from the page 42 and any material that extruded from the edges of the sandwich is prevented by the aluminum from sticking to the laminator rolls. At the same time, when the page cools and the aluminum is removed, the heat-sealable material no longer sticks to adjacent materials and the pamphlet may readily be refolded into its conventional format and used.

We have found that the laminator of the above-described construction is particularly efficient for the use herein described. The rolls are floatingly mounted as shown in FIG. 3 and are biased toward each other by the spring 50. In this manner the rolls of each pair run in driving contact with each other through their surfaces and transmit the laminating loads evenly. Thus, although an open passageway is provided in the apparatus, the rolls are not cantilevered and inexpensive resilient support means have proven satisfactory. An extremely simple, relatively inexpensive, technique has thus been provided for laminating passports and like identification documents. No technical skill whatever is required in the lamination of these documents by the present apparatus and method. Further, the supplies employed are precut rectangles of film and a supply of reusable clips 46, both items that may easily be stored and transported compared to previously employed roll materials. It will be seen, accordingly, that we have provided a novel and substantially improved system for laminating single leaves of multiple leaf-bound documents.

In the embodiment illustrated a thin table guide is shown at 17 extending between tables 11 and 12 in the interrupted roll area only. This insurres against catching the pages 41,43 against the front edge of the table 12 and is useful with certain books. Alternatively, providing the forward edge of table 12 with a downward slope toward the bottom roll axis will also provide against any such jamming.

It will be apparent that modifications may be made in the structure of the present invention without departing from the scope of the novel concepts thereof. For example, where one side only of the page 42 is to be laminated, the heater on the other side of the sheet may be eliminated or merely deenergized. Further, materials other than metal can be used for clip 46. For example, silicone-treated release paper may be used since it readily peels away from the extruded edges of the film 44 after lamination. The metal clip is preferred since it more rigidly supports the page 42, minimizes wrinkles and provides improved heat transfer. It is, accordingly, our intent that the scope of the invention be limited solely by that of the hereinafter appended claims.

We claim as our invention:

1. Apparatus for laminating a film of heat-sealable plastic to a sheet of material previously bound to other materials not being laminated, comprising a first pair of driven laminating feed rollers providing a first nip, a second pair of driven laminating pressure rollers providing a second nip in general alignment with the first nip but spaced therefrom, whereby a laminating sandwich of sheet material introduced into said first nip is driven by the first pair of rolls therefrom into the second nip via a substantially straight path, heater element means between said pairs of rolls lying adjacent at least one side of said path, at least one of the rolls of each of said pairs of rolls having the surface thereof intermediate its ends reduced in diameter along a portion only of its length (abbreviated) throughout its circumference to provide a wide passageway for free passage of said other material therethrough.

2. The laminating structure set forth in claim 1 wherein the ends of the rolls of each pair of rolls are biased toward each other to provide a tight nip and wherein the abbreviated portion is in each case intermediate the ends of the roll.

3. The laminating structure set forth in claim 1 wherein said heater element means is also cut away along the length of roll surface abbreviation to provide a large width passageway.

4. The laminating structure set forth in claim 1 wherein said heater element means comprises spaced bars both above and below said path.

* * * * *